(12) United States Patent
Bauch

(10) Patent No.: US 6,839,627 B1
(45) Date of Patent: Jan. 4, 2005

(54) MOBILE ROUTE MONITORING UNIT

(76) Inventor: Horst H. Bauch, Grafstrasse 1, 82008 Unterhaching (DE)

( * ) Notice: Subject to any disclaimer, the term of this patent is extended or adjusted under 35 U.S.C. 154(b) by 117 days.

(21) Appl. No.: 10/089,094

(22) PCT Filed: Oct. 16, 2000

(86) PCT No.: PCT/EP00/10175

§ 371 (c)(1),
(2), (4) Date: Aug. 12, 2002

(87) PCT Pub. No.: WO01/26940

PCT Pub. Date: Apr. 19, 2001

(30) Foreign Application Priority Data

Oct. 14, 1999 (DE) ......................................... 199 49 622

(51) Int. Cl.⁷ ............................................. G01C 21/36
(52) U.S. Cl. ..................................................... 701/209
(58) Field of Search ................................ 701/200, 202, 701/205, 207–210, 213–214; 340/998, 990, 991–995; 342/357.01, 357.06, 357.08

(56) References Cited

U.S. PATENT DOCUMENTS

| | | | |
|---|---|---|---|
| 5,068,656 A | | 11/1991 | Sutherland |
| 5,488,559 A | * | 1/1996 | Seymour .................... 701/208 |
| 5,742,923 A | * | 4/1998 | Odagawa .................... 701/207 |
| 5,751,245 A | | 5/1998 | Janky et al. |
| 6,108,603 A | * | 8/2000 | Karunanidhi ............... 701/208 |

FOREIGN PATENT DOCUMENTS

| | | |
|---|---|---|
| DE | 29 23 634 | 1/1985 |
| DE | 42 14 067 | 8/1995 |
| DE | 196 46 954 | 8/1998 |
| GB | 2281141 | 2/1995 |

* cited by examiner

*Primary Examiner*—Thu V. Nguyen
(74) *Attorney, Agent, or Firm*—Oblon, Spivak, McClelland, Maier & Neustadt, P.C.

(57) ABSTRACT

A mobile route monitoring unit including a data store, which stores predefined route data, a position sensor, which determines the position of the mobile route monitoring unit, a processor, which determines possible deviations from a route defined by the route data, a permissible route, and the actual position of the unit and a transmitter, which in the event of a deviation from the route sends a signal to a center. The above-mentioned elements form a mobile unit that enables self-sufficient route monitoring to be performed, which can accordingly occur locally, i.e., executed by the mobile route monitoring unit. The necessity of transmitting cost incurring signals at regular intervals becomes superfluous. Non-permissible route deviations are rapidly determined and are securely communicated by sending a signal to the center. The utilization of a permissible and defined region instead of the route is also realized.

10 Claims, 3 Drawing Sheets

MOBILE ROUTE MONITORING UNIT

BACKGROUND OF THE INVENTION

1. Field of the Invention

The invention relates to a mobile route-monitoring unit, to be used in particular in a truck.

2. Discussion of the Background

Every shipping company is faced with the problem of comparing the current location of its trucks and their cargoes with a planned route and schedule. The foregoing is necessary to identify any tardiness or theft/seizure as early as possible.

Previously, this problem was successfully solved by a transmission unit installed in the truck sending current location information to the control room at certain time or distance intervals determined by a GPS receiver or a gyrosensor. The previous method for transmitting information was using a mobile phone network Short Message Service, because the costs of sending messages via SMS are substantially lower than voice mobile communications. The position message was processed at the control room and compared with the planned route and time data, which in the event of a route deviation set off an alarm.

Frequently, an "authorized area" system is used to define a route deviation; in this system the planned route is represented as a series of consecutive ellipses, which cover the planned route plus minor lateral deviations. Staying outside the "authorized" consecutive ellipses is considered a route deviation. An example of this type of route representation is shown in FIG. 3.

FIG. 3 shows a route 1 and a number of ellipses 10 which cover the route and taken together establish an ample "authorized route corridor." Typically, the traveled route is measured using an odometer in the truck and a position message is sent to the control room via SMS service, for example every 10 km. Such messages are represented in the figure by message points 9A, 9B and 9C.

This type of system has many disadvantages. For example, the truck has to send confirmation signals at regular intervals, which results in high costs. This is especially true for foreign travel, because SMS messages cost significantly more abroad than domestically. That explains why the intervals between confirmation signals tend to be large. Which in turn leads to a substantial increase in the size of the probable location at any given moment. This problem is also shown schematically in FIG. 3: Circle 11. Circle 11 has a radius r, of, for example, 10 km, at message point 9B. The shaded area of Circle 11 therefore represents the "unauthorized" area in which a vehicle can be located which is moving along the route on schedule at message point 9B. In general, a route representation using "authorized" elliptical areas produces an uneven route corridor that allows and/or prohibits widely divergent deviations. In FIG. 3, for example, the authorized deviation A from message point 9A to the west (in FIG. 3 north is indicated using the usual cartographic convention) is substantially smaller than the authorized deviation B from message point 8A to the east.

The fact that SMS service is currently available in about only 40% of Europe results in an additional, considerable limitation to the possibility of monitoring.

SUMMARY OF THE INVENTION

Accordingly, the purpose of the invention is to avoid the abovementioned disadvantages of the current technology and to achieve the advantages described below.

To meet these objectives, the invention provides a mobile route-monitoring unit.

The invention comprises four essential components, which together form a mobile route-monitoring unit:

- a data memory, which stores the preset route data;
- a position sensor which determines the position of the mobile route monitoring unit;
- a processor which determines any route deviations between the route defined by the route data and the unit's actual position; and
- a transmitter, which sends a message to the control room in the event of a route deviation.

Although the components of the invention form a unit, this does not have to exist in a physical sense. The components of the invention can, if necessary, also exist as separate modules connected electronically to the unit. Preferably, the mobile route monitoring unit is attached, if necessary in a non-detachable manner, to or in a carrier whose position is to be monitored, for example a truck, a container, an airplane, ship, etc.

Combining the above components into a mobile route-monitoring unit makes possible autonomous route monitoring, which can be performed on site, i.e. on the carrier. The above eliminates the need to transmit cost-generating signals at regular intervals. However, a route deviation will be determined quickly, and securely reported to the control room by transmitting a signal.

Since signals do not have to be transmitted at regular intervals, it is possible to use a transmitter when transmission costs are of lesser importance and transmission quality and/or availability are of greater importance. Such a transmitter (optionally using a matching receiver, despite the fact that the following will mention only a "transmitter," as the specialist will be able to tell the difference) can also perform other communications services between the carrier of the mobile unit and/or a person or device assigned to this carrier (for example: driver, captain, motor or control device) and the control room or to another location. For example, as needed, a voice channel can be established between a driver or cab and a control room via the transmitter. In the event of a conspicuous route deviation, the above could be used to initiate an acoustic monitoring of the cab without being heard in the cab. Similarly, a text message could be sent between a driver and a control room using a keyboard or display in conjunction with the transmitter. Also, visual and operating data and/or information could be exchanged using the transmitter. That way control commands could be received which are meant for the mobile route monitoring unit, the carrier or a device assigned to the carrier. For example, in the event of theft or seizure of the vehicle, a control command to the vehicle electronics could be used to disable the vehicle. A control command to the mobile route-monitoring unit could be used to update the route data stored in the data memory.

Preferably, the processing of the route data from the planned route is performed by an external device using a physically or electronically stored map or chart, for example in a PC located at the control room. The route data could then be used according to methods known to specialists to, for example, transmit to the data memory of the route-monitoring unit via modem, line-of-sight radio, transmitter, or cable. In this instance, specialists weigh convenience, availability and investment costs. A cable connection is cost effective and can be set up in many locations. For example, a radio link enables easy data transfer. However, to update route data, the route monitoring unit according to the invention could also contain a reader to read a portable storage medium, such as a CD, a floppy disk or a memory card, etc., on which the route data is stored.

It is, however, also the purpose of the invention that route data can be called up or processed or calculated in the unit, for example using departure or arrival data which can be entered by keyboard or other entry device. Such an application is useful in particular where the route repeatedly traverses given sections or parts of sections. Route data can be updated at any time, though this is done preferably when the carrier of the route-monitoring unit is at a loading yard. If necessary, data can be updated by a limited range modem with a frequency and power that does not require a separate license.

According to the invention, the route-monitoring unit also comprises a position sensor which determines the route monitoring unit's current position. Preferably, a GPS receiver is used as a position sensor, although other position indicating arrangements known to specialists can also fulfill this purpose, such as a wheel, acceleration or gyrosensor evaluation or similar method. It can also be advantageous to indicate the route monitoring unit's position using a redundant system consisting of a number of position determining devices and in which the results of the position determining devices can be matched, if necessary, to increase directional precision.

The route-monitoring unit according to the invention stores route data in the provided data memory. The route data reproduce the planned, released route [or route course] in such a way that this can be compared with the position data generated by the position sensor. These position data reflect the current position of the route-monitoring unit, which may be mounted on a carrier. The comparison in the route-monitoring unit is made by a processor provided for that purpose.

Preferably, the route is represented as a sequence of consecutive coordination points and associated vectors. Accordingly, the route data consists of pairs of vector data and coordinate data, whereby the coordinate data can be the same as or similar to those of a GPS. FIG. 2 shows this kind of route representation. It is advantageous to place the coordinate points close together to insure precise route reproduction and therefore rapid recognition of any deviation. However, to match the route the coordination points can use different spacing. In the vector representation of the route according to the invention the coordinate points of straight sections can be placed further apart than those in curved sections without negatively impacting the precision of section reproduction. By thus reducing the amount of route data the route monitoring unit's data memory can be utilized in an optimum fashion.

Typically, a deviation from the route is measured vertically from the next route vector or, if necessary, as radius from the next route coordinate. The allowable deviation can be either a fixed value or dependant on the route section or the route. In the event of a route tolerance varying depending on the route section, preferably selected route data will be stored along with tolerance data which define the allowable deviation of the route section. Thus, for example, the route tolerance can be increased in a curved section to reduce the number of coordinate points needed to represent a route/ section.

Integrating a timer device into the route monitoring unit according to the invention allows monitoring of compliance with the route by spatial but also by time criteria. Specifically, time information can be stored with the route data, which indicates the earliest and/or latest times when given coordinate points should be reached. The data from the timer device can also be used to identify the speed of the route-monitoring unit. Such measures can be used to ensure, for example, that a delivery schedule is kept without violating laws concerning speed, stops, etc. Breakdowns and improper stops can also be determined this way.

The invention can also so be produced as a system, which in addition to the route-monitoring unit described above comprises additional components physically separate from the route-monitoring unit.

For example, such a system can comprise the abovementioned external apparatus to input and process route data or a receiver assigned to the transmitter or receiver/transmitter device.

BRIEF DESCRIPTION OF THE DRAWINGS

An application of the invention is described below in greater detail using drawings.

DESCRIPTION OF THE PREFERRED EMBODIMENTS

Figure 1:
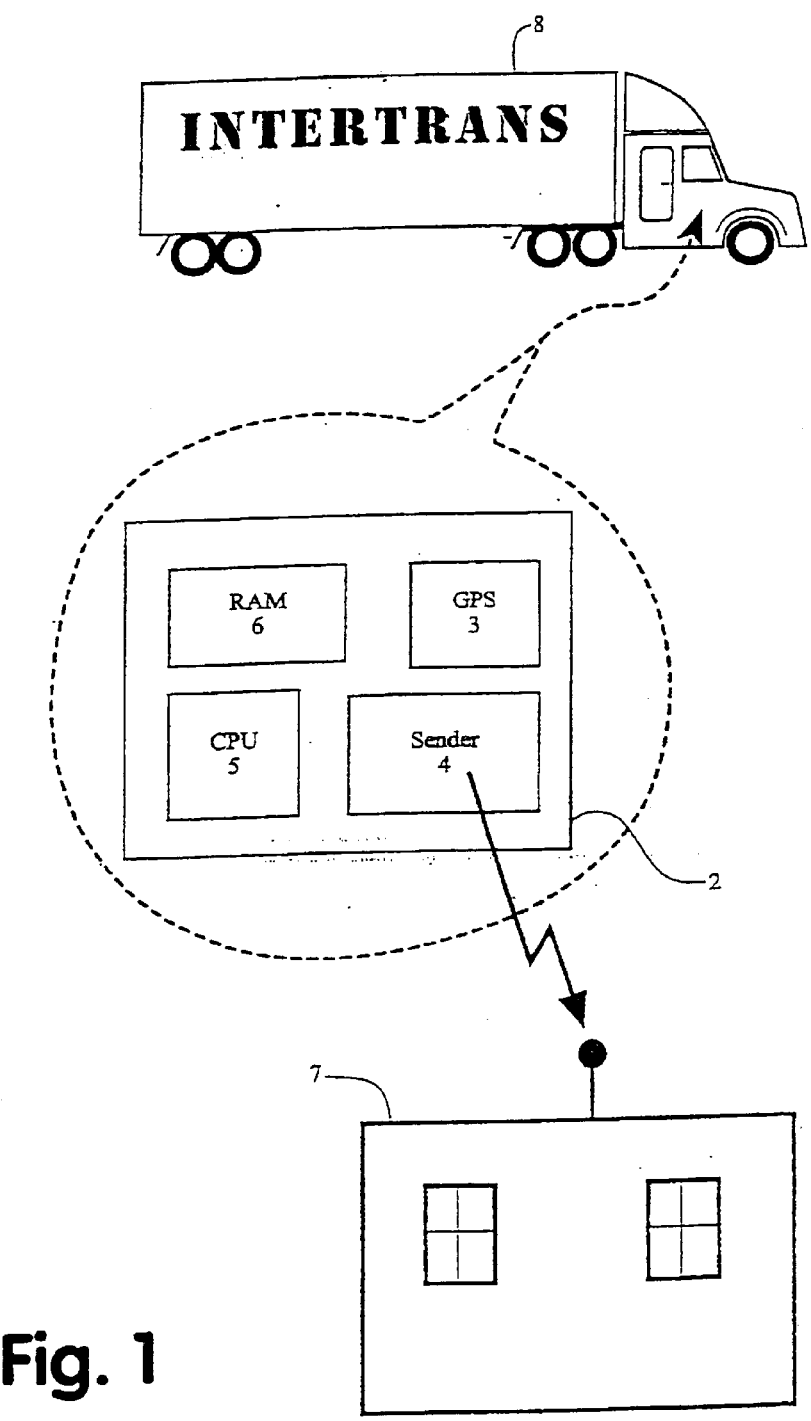
FIG. 1 A route monitoring unit according to a first application.

FIG. 1 shows a route monitoring unit according to the invention 2 with a storage unit 6, a position sensor 3, a processor 5 and a transmitter 4, which can, if desired, send data to a control room 7. According to the first application, the position of the route-monitoring unit is determined by a GPS receiver as the position sensor 3; route data is stored in a RAM 6 and processed in a CPU 5. According to the first application, the route-monitoring unit 2 is installed in the cab of a truck 8.

Figure 2:
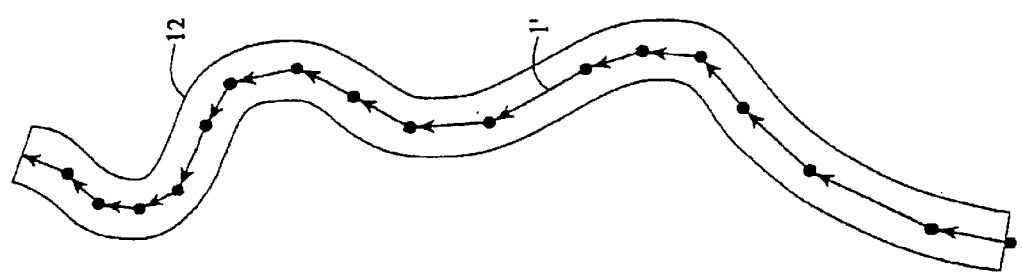
FIG. 2 Route monitoring according to a preferred application of the invention.
Figure 2:
Figure 2:
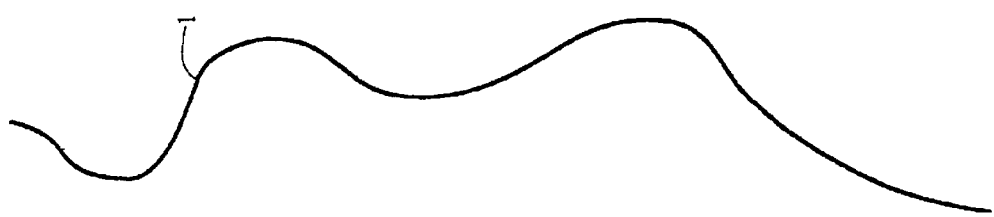
Figure 3:
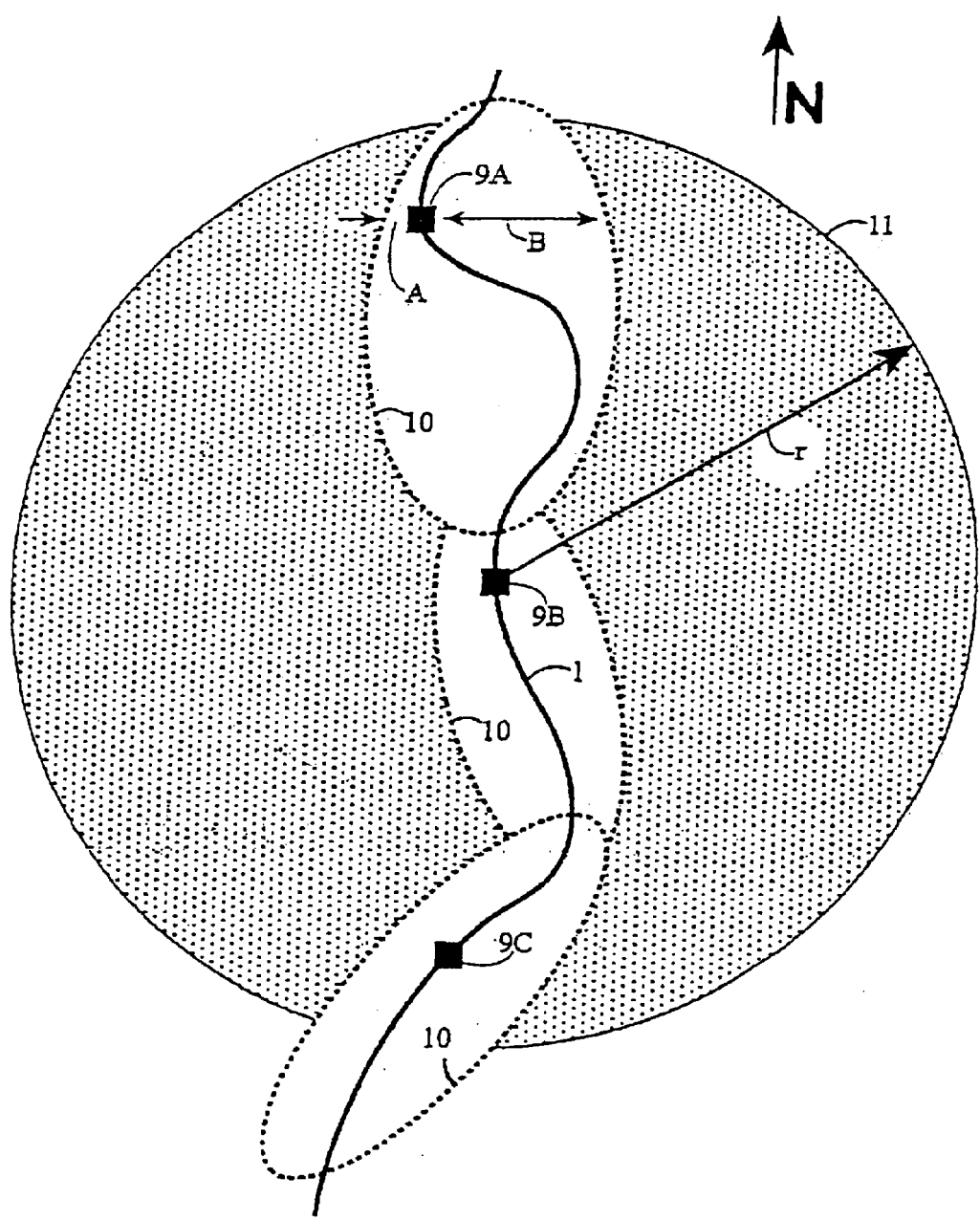
FIG. 3 Route monitoring according to the current state of the art.

According to a preferred application of the invention, a planned route 1 is reproduced by vector data, which are stored as route data in storage unit 6 of the route-monitoring unit. As represented schematically in FIG. 2, the individual vectors which are shown graphically in FIG. 2 as a point and an arrow can be stored or configured consecutively to define a route simulation 1' of the actually planned route 1. The points of the aforementioned coordination points and the arrows represent the respectively associated vectors.

Above all, the simulation of route 1 within route monitoring unit 2 has the advantage of being able to frequently or constantly check the current position of route monitoring unit 2 and/or its carrier 8 without entailing high communications costs. The foregoing makes it possible to keep route monitoring unit 2 from leaving a narrowly authorized route corridor 12 around route simulation 1' without such a deviation from the planned route 1 being recognized quickly.

Typically, the authorized route corridor 12 extends from the beginning of the route to the indicated route end. However, the authorized route corridor can be limited to a selectively calculated route section. An additional temporal limitation of the authorized location of route monitoring unit 2, as described above, can result in the authorized route corridor 12 being dynamically cut in length. That means that the length of the authorized route corridor 12 is dynamically updated using the stored route time information and/or the currently or previously measured position data of route monitoring unit 2, and thereby limited to a given current route section.

The GPS receiver 3 determines the position of route monitoring unit 2 and/or the position of the carrier 8 carrying route monitoring unit 2. The position information thus acquired is processed in CPU 5 and/or compared with a route simulation 1' of the planned route 1 produced from route data stored in storage unit 6. If necessary, the spatial check of route compliance is supplemented, as described above, with a route compliance check based on temporal standards. If an unauthorized route deviation is found by route monitoring unit 2, an appropriate message will be sent to the control room 7. Preferably, this message is sent via the voice channel of the GSM network, i.e. the global system for mobile communications, an international mobile telephone and data network.

It is further advantageous to equip the route-monitoring unit with a receiver which also uses the GSM network to be able to set up an interactive voice channel between the cab and the control room.

Preferably, the route monitoring unit also comprises a 433 MHz modem as data reception device which can be used to load current route data from the transmitters or data processing apparatus in the respective loading yards to storage unit 6.

The applications and utilization methods given as examples in the Description are merely intended to provide examples of what the specialist understands or could understand as equivalent in the respective context, and which under given circumstances he could use in place of the enumerated examples. Such equivalents are thus as much a part of the invention as the explicitly enumerated, incomplete examples.

What is claimed is:

1. Mobile route monitoring unit comprising:
   a data memory configured to store route data with tolerance data;
   a position sensor configured to indicate a position of the mobile route-monitoring unit;
   a processor configured to indicate possible route deviations between a route defined by the route data and a current position of the route monitoring unit; and
   a transmitter, which in an event of a route deviation, is configured to send a message to a control unit;
   wherein the route data represents the route in a form of coordinates and assigned route vectors, and the tolerance data exists as authorized deviation values in a vertical direction of a next route vector, whereby a length of the route vectors and the authorized deviation values for all route vectors can be selected depending on the route and can be adjusted to the route.

2. Mobile route monitoring unit according to claim 1, wherein the transmitter communicates by a GSM network voice channel.

3. Mobile route monitoring unit according to claim 1, further comprising a data reception device to receive preset route data.

4. Mobile route monitoring unit according to claim 3, wherein the data reception device includes a reader configured to read data from a changeable storage medium.

5. Mobile route monitoring unit according to claim 3, wherein the data reception device includes a receiver configured to communicate by a voice channel of a GSM network.

6. Mobile route monitoring unit according to claim 1, further comprising an input to receive preset route data.

7. Mobile route monitoring unit according to claim 1, wherein the position sensor includes a GPS receiver.

8. Mobile route monitoring unit according to claim 1, wherein the stored route data can be changed at any time.

9. Route monitoring system, comprising:
   a mobile route monitoring unit comprising:
      a data memory configured to store route data with tolerance data;
      a position sensor configured to indicate a position of the mobile route-monitoring unit;
      a processor configured to indicate possible route deviations between a route defined by the route data and a current position of the route monitoring unit; and
      a transmitter, which in an event of a route deviation, is configured to send a message to a control unit;
   wherein the route data represents the route in a form of coordinates and assigned route vectors, and the tolerance data exists as authorized deviation values in a vertical direction of a next route vector, whereby a length of the route vectors and the authorized deviation values for all route vectors can be selected depending on the route and can be adjusted to the route;
   wherein the route monitoring system comprises a device to process the route data.

10. Route monitoring system comprising:
    a mobile route-monitoring unit comprising:
       a data memory configured to store route data with tolerance data;
       a position sensor configured to indicate a position of the mobile route-monitoring unit;
       a processor configured to indicate possible route deviations between a route defined by the route data and a current position of the route monitoring unit; and
       a transmitter, which in an event of a route deviation, is configured to send a message to a control unit;
       wherein the route data represents the route in a form of coordinates and assigned route vectors, and the tolerance data exists as authorized deviation values in a vertical direction of a next route vector, whereby a length of the route vectors and the authorized deviation values for all route vectors can be selected depending on the route and can be adjusted to the route;
    wherein the route monitoring system comprises a receiver assigned to the transmitter.

* * * * *